Oct. 11, 1938     J. H. DAVIS     2,132,867

METHOD OF MAKING BEARINGS

Filed June 11, 1936

Inventor

James H. Davis

By Spencer Hardman & Fehr his Attorneys

Patented Oct. 11, 1938

2,132,867

UNITED STATES PATENT OFFICE 2,132,867

METHOD OF MAKING BEARINGS

James H. Davis, Dayton, Ohio, assignor to General Motors Corporation, Detroit, Mich., a corporation of Delaware Application June 11, 1936, Serial No. 84,607

4 Claims. (Cl. 29—149.5)

This invention relates to a method of making bearings having a porous metal lining and a relatively strong outer metal sleeve fixed thereto.

Porous metal bushings made by briquetting and sintering powdered metals are now well known and in wide use. It is also well known to install such porous metal bushings upon their supporting members by a pressed fit into a suitably sized aperture in the supporting member. However, there is a quite low practical limit to the tightness of such a pressed fit that can be had with porous metal bushings due to the compressibility of the porous metal constituting the inserted bushing. In other words, if a porous metal bushing is pressed into an aperture which gives too tight a pressed fit the entire body of the bushing may be caused to flow radially inward and reduce the inside diameter of the bushing. This will obviously necessitate resizing of the bushing bore after it is assembled upon the machine or other supporting member.

Now an object of this invention is to provide a bearing unit comprising a porous metal bushing having a relatively non-compressible outer metal sleeve strongly fixed thereto, the bond of the outer sleeve to the porous bushing being made stronger after said bushing is press-fitted into said outer sleeve.

An important feature of this invention is the simple and efficient method of increasing the strength of the attachment of the porous bushing to its outer metal sleeve after the bushing is pressed into the outer sleeve. The porous metal bushing thus strongly fixed within a relatively non-compressible outer metal sleeve forms a unitary bearing unit which can then be press-fitted into an aperture in its final supporting member with a very tight pressed fit without danger of reducing the inside diameter of the porous metal bushing, and hence avoids the necessity of again sizing this inside diameter after such final assembly.

Further objects and advantages of the present invention will be apparent from the following description, reference being had to the accompanying drawing wherein a preferred embodiment of the present invention is clearly shown.

In the drawing.

Similar reference characters refer to similar parts throughout.

Figure 3:
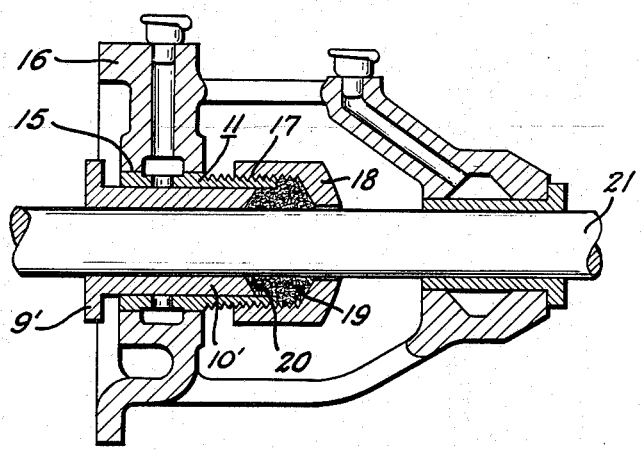
Fig. 3 is similar to Fig. 2, but illustrates what will happen to the porous metal bushing in use if it is not sufficiently strongly bonded to its outer metal sleeve.

Numeral 10 designates the porous metal bushing and 11 is an outer relatively non-compressible metal sleeve within which bushing 11 is strongly fixed by the method of this invention. Bushing 10 is first separately made by briquetting a mixture of finely divided metals, and other ingredients if desired, into bushing form and then sintering the briquette thus formed in a non-oxidizing or reducing atmosphere until the powdered metals partially fuse or alloy together and form a continuous porous metal bushing of very substantial strength and porosity. Such porous metal bushings are well known and in wide use and hence a detailed description of making same is thought unnecessary in this description. However reference is made to the following patents for a more detailed description of this method of making porous metal bushings which may be used with this invention: Williams 1,556,658, Williams et al. 1,642,347, 1,642,348 and 1,642,349; Williams 1,661,245; Williams 1,738,163; Williams 1,761,506. In other words, the method of this invention is applicable to a wide variety of sintered porous metal bushings 10. The sintered porous metal bushing 10 is pressed into the bore of the outer metal sleeve 11 which may have any desired outer contour, such for instance as that shown in the drawing. The pressed fit of bushing 10 in sleeve 11 should be snug but not so tight as to flow or otherwise damage the main body of the porous metal material of which bushing 10 is made.

After bushing 10 is thus pressed into its outer sleeve 11 this unitary assembly is again subjected to a temperature approximating the original sintering temperature theretofore used in making bushing 10, preferably in a reducing atmosphere, for such a time period as will cause bushing 10 to at least partially bond to the inner surface of sleeve 11 with a metallic bond. The inner surface of the sleeve 11 should be of some metal which has a bonding affinity to the metal of the porous bushing 10 at the temperature used in this second heating step. If bushing 10 is of porous bronze, sleeve 11 may be of solid brass, bronze, or any similar alloy, or it may be of steel having its inner bore plated with a thin coating of tin, copper, or other metal or alloy which has a bonding affinity for the porous metal of bushing 10 at the temperature used in this heating step. During this second heating step bushing 10 will ordinarily begin bonding to the outer sleeve 11 over numerous tiny areas distributed over the contacting surfaces of these parts, and these tiny areas where a metallic bond first occurs increase in size with an increase in the time period of this second heating step. Normally the strength of the bond between bushing 10 and sleeve 11 will be sufficient if these tiny bonded areas are only microscopic in size or barely visible to the naked eye. The presence of such small numerous bonded areas is revealed by correspondingly small bright spots on the inner surface of sleeve 11 if a portion of sleeve 11 be cut away and forced upwardly from its bond with bushing 10. The presence of these numerous tiny bonded areas very greatly increases the force necessary to push the bushing 10 endwise partly from the outer sleeve 11.

As a specific example of the benefits of the method of this invention the following is given: Sintered porous bronze bushings 10 having a composition of 90 parts copper, 10 parts tin, and 2 parts graphite were made by briquetting the finely divided ingredients into bushing form and sintering same in a reducing atmosphere for 8 minutes at a temperature of 1500° F. These sintered bushings were then sized to the desired inside and outside diameters. Now such sized bushings were pressed within brass outer sleeves 11 with such a pressed fit that it required a total force of only about 1300 pounds to push the bushing 10 endwise out of the brass sleeve 11. Now in order to increase the strength of the hold of the bushing within the sleeve, these assembled units of bushings and outer sleeves were heated to a temperature of 1500 F. for 8 minutes in a reducing atmosphere. After cooling these reheated units, it was found that it required a force of about 3760 pounds to push the bushing 10 endwise out of the brass sleeve 11. In other words, the second heating step increased the hold of the porous metal bushing to its outer sleeve almost three times. And this advantage was obtained without any change in size of the bore of the bushing 10 and hence no resizing of this bore was required.

Figure 1:
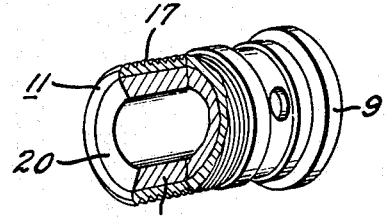
Fig. 1 is a perspective view, partially cut away, of a bearing unit made according to this invention.
Figure 2:
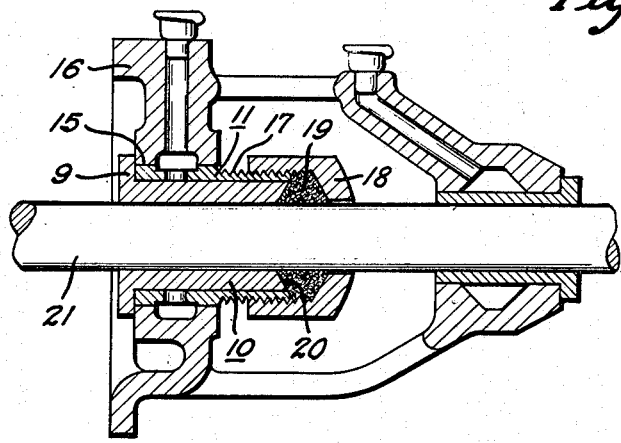
Fig. 2 is a sectional view showing the bearing unit of Fig. 1 finally assembled in place upon a supporting casting by a pressed fit within an aperture in said casting.

Figs. 2 and 3 of the drawing illustrate one important advantage of a strong hold between bushing 10 and its outer sleeve 11. In these figures, the bearing unit of Fig. 1 is pressed-fitted into a bore 15 in casting 16 which serves as a support for the bearing. The outer surface of sleeve 11 is threaded at 17 to receive a packing nut 18 which highly compresses the packing material 19 against the inner end 20 of bushing 10 in order to prevent leakage of water from the end of the bearing 10. Shaft 21 is secured to and drives a water-pump impeller (not shown) located adjacent the flange 9 of bushing 10. Obviously the pressure of packing 19 upon the inner end 20 of bushing 10 tends to push bushing 10 endwise out of its sleeve 11, and such endwise movement of the bushing is illustrated in Fig. 3. If bushing 10 is strongly bonded to its outer sleeve 11 by the simple and efficient method of this invention it can readily withstand the maximum end pressure thereupon which may be exerted by packing nut 18.

Of course this invention is useful in many applications, other than as shown in Figs. 2 and 3, wherever it is desired to strongly bond a porous metal lining to an outer metal sleeve.

While the embodiment of the present invention as herein disclosed, constitutes a preferred form, it is to be understood that other forms might be adopted, all coming within the scope of the claims which follow.

What is claimed is as follows:

1. The steps in the method of making an integral cylindrical porous metal bushing having a cylindrical outer metal sleeve fixed thereto, comprising: briquetting powdered metals into bushing form, sintering the briquette until the metal particles thereof partially fuse and alloy together and form an integral porous metal bushing, forcing said porous metal bushing endwise into a cylindrical outer metal sleeve, then heating this assembly to such a temperature and for such a time period as will cause the porous metal bushing to at least partially alloy bond to said sleeve.

2. The steps in the method of making an integral cylindrical porous metal bushing having a cylindrical outer metal sleeve fixed thereto, comprising: briquetting powdered metals into bushing form, sintering the briquette until the metal particles thereof partially fuse and alloy together and form an integral porous metal bushing, forcing said porous metal bushing endwise into a cylindrical outer metal sleeve with a pressed fit, then heating this assembly to a temperature approximating the sintering temperature theretofore used in sintering said porous bushing whereby to greatly increase the hold of the porous bushing in the outer metal sleeve.

3. The steps in the method of making an integral cylindrical porous bronze bushing having a cylindrical outer metal sleeve fixed thereto, comprising: briquetting bronze-forming metal powders into bushing form, sintering the briquette at such a temperature and time period as will cause the metal particles thereof to alloy together and form an integral porous bronze bushing then pressing said bushing endwise into a cylindrical outer brass sleeve, then heating this assembly to such a temperature and for such a time period as will cause the bronze bushing to at least partially alloy bond directly to said brass sleeve.

4. The steps in the method of making an integral cylindrical porous metal bushing having an outer supporting member bonded thereto, comprising: forming a cylindrical porous metal bushing by sintering together metal powders, providing an outer supporting member having a bore therethrough, forcing the porous metal bushing endwise into the bore of said supporting member, and then heating the assembled cylindrical porous metal bushing and supporting member to such a temperature and for such time period as will cause the porous metal bushing to at least partially bond to the outer supporting member.

JAMES H. DAVIS.